No. 838,761. PATENTED DEC. 18, 1906.
J. A. ARMENT.
VOTING MACHINE.
APPLICATION FILED DEC. 23, 1904.

Witnesses
Frank R. Glore
H. C. Rodgers

Inventor
J. A. Arment
By George H. Thorpe
Atty.

No. 838,761. PATENTED DEC. 18, 1906.
J. A. ARMENT.
VOTING MACHINE.
APPLICATION FILED DEC. 23, 1904.

Witnesses
Frank P. Glove
H. C. Rodgers

Inventor
J. A. Arment
By George J. Thorpe
Atty.

No. 838,761. PATENTED DEC. 18, 1906.
J. A. ARMENT.
VOTING MACHINE.
APPLICATION FILED DEC. 23, 1904.

Witnesses
Frank R. Glow.
H. E. Rodgers.

Inventor
J. A. Arment
By George H. Thorpe
Atty.

No. 838,761. PATENTED DEC. 18, 1906.
J. A. ARMENT.
VOTING MACHINE.
APPLICATION FILED DEC. 23, 1904.

No. 838,761. PATENTED DEC. 18, 1906.
J. A. ARMENT.
VOTING MACHINE.
APPLICATION FILED DEC. 23, 1904.

Witnesses
Frank R. Glove
H. C. Rodgers

Inventor
J. A. Arment.
By George J. Thorpe
Atty.

UNITED STATES PATENT OFFICE.

JAMES A. ARMENT, OF DODGE CITY, KANSAS.

VOTING-MACHINE.

No. 838,761.      Specification of Letters Patent.      Patented Dec. 18, 1906.

Application filed December 23, 1904. Serial No. 238,127.

*To all whom it may concern:*

Be it known that I, JAMES A. ARMENT, a citizen of the United States, residing at Dodge City, in the county of Ford and State of Kansas, have invented certain new and useful Improvements in Voting-Machines, of which the following is a specification.

This invention relates to voting-machines; and my object is to produce a machine of this character which operates efficiently and reliably and by which a voter is enabled to cast his vote with far greater celerity, ease, and convenience than is possible by the method of voting most generally followed.

A further object is to produce a machine of this character which possesses the desirable features of simplicity, strength, durability, compactness, and comparative inexpensiveness of construction.

With these and other objects in view, as hereinafter appear, the invention consists in certain novel and peculiar features of construction and organization, as hereinafter described and claimed, and in order that it may be fully understood reference is to be had to the accompanying drawings, in which—

In order that the secrecy of the ballot may be maintained, it is essential that any voting-machine shall be inclosed within a booth through which the voters successively pass, casting their votes while in the booth, so that it is impossible for any one to see for whom the votes are cast.

The booth which I employ is constructed as follows: 1 designates a rectangular base portion having an opening 2 in its upper side and, if desired, a drawer 3 below said hole, access being had to the hollow base portion or to the drawer by means of a door 4 in one of the walls of said base portion, which door is adapted to be kept locked until the election commissioners are ready to count the votes. 5 designates side walls erected upon the base portion near its opposite ends, and 6 strips secured to the rear ends of said side walls to provide convenient supports for a door or doors 7, hinged to said strips, these doors being adapted to be closed together and locked in any suitable manner (not shown) for the purpose of preventing an unauthorized person from noting the number of votes cast for the various candidates, as the voting-machine is only separated from said doors by the doors 8, provided with transparent panels 9, said doors 8 being hinged to supporting-strips 10, secured to the inner sides of walls 5, and in this connection it should be stated that it is desirable to secure doors 7 and 8 by a plurality of locks requiring different keys, so that the doors cannot be unlocked until all of said keys have been collected. In practice each election commissioner, should have the key for a particular lock, so that it will be necessary for all of the commissioners to be present to give access to the machine. Secured to the front edge of the left-hand wall 5 is a strip 11, to which the entrance-door 12 is hinged, said door being adapted to open outwardly and having a spring 13 to effect its automatic closure, the closing movement being limited by abutment 14, carried by the front wall 15 of the booth, said wall being of any suitable character and preferably supported by the screws 16, engaging the floor. Said door is provided at its outer side with a suitable spring-lock 17, the bolt of which is withdrawn to open the door when a voter enters the booth, and said latch automatically locks said door when closed by spring 13 and makes it impossible for the voter to leave the booth at the point of entrance. Secured to the opposite side wall 5 is a supporting-strip 18 for a hinge-door 19, which door opens outwardly, as indicated by the proximate arrow, Fig. 1, and is closed by means of a spring 20, secured at one end to the door and at the other to a fixed point of the booth. Said door has a spring-lock 21 at its inner side, so that after the booth occupant votes he may withdraw the latch, push the door open, and leave the booth, the door automatically closing after him. The latch being inaccessible to any one but the occupant of the booth makes it impossible for an outsider to open the door. Said door, like door 12, closes against an abutment 22, these abutments 14 and 22 being preferably cushioned for the purpose of rendering the opening and closing of the door as noiseless as possible.

For folding the booth in the smallest compass possible in order that it may be more conveniently portable a supporting-strip 23 is secured to the inner side of wall 5 contiguous to strip 18 and is equipped with hinge members 24 for engagement with hinge members of door 19, the hinge being of that type in common use which permits the door to be lifted from its support. The hinge members of door 19 are then secured in operative relation with hinge members 24, and said door is then swung inwardly to occupy the vertical plane of and between strips 23 and 25, secured to the opposite wall 5, and door 12 is then swung inwardly to the plane of strips 11 and 18, it being also desirable that suitable means shall be provided for securing the free edges of doors 19 and 12 to the contiguous strips 25 and 18, respectively. The front wall 15 of the booth can then be secured in any suitable manner against the outer side of the door 12.

The walls 5 are permanent, being connected by a movable top (not shown because not indispensable,) and at their inner sides are vertically grooved to provide recesses 26 to receive the voting-machine, the latter being slipped down from above by preference until it rests upon the top of the hollow base portion 1, it being understood in this connection that I do not limit myself to this particular arrangement of the voting-machine within the booth.

Referring to the voting-machine proper, 27 designates the front wall; 28, the back wall; 29, the side walls connecting said front and back walls, and 30 the top wall, the latter being desirable if the booth is not provided with a top, so as to exclude dust and other foreign matter from the interior of the machine.

Secured horizontally to the face of the voting-machine is a plate 31, instructing the voter how to vote a straight party-ticket, and secured in a horizontal line below said plate is a series of labels 32, representative of the different tickets in the field—for example, Republican, Democratic, People's, Social, Prohibition, and Independent tickets—and arranged against the face of the casing below said labels are vertical labels 33, that below the Republican label displaying the candidates on the Republican ticket, that below the Democratic label displaying the candidates of the Democratic ticket, and so on. In the drawings one ticket only is lettered, said ticket showing the number of Presidential electors, justices of the supreme court, and all of the other State and county officers for the particular district and precinct within which the machine is located, it being understood, of course, that the names of the Presidential electors and other candidates may also appear on the ticket, said names being omitted from the drawings because of insufficient room to properly show them. Each ticket is rendered inaccessible to the voter, so that he cannot tear, deface, or otherwise tamper with it, by the cover 34, of glass or other transparent material, this cover and the ticket being supported in position by retainers 35, screwed or otherwise secured to the casing.

Figure 1:
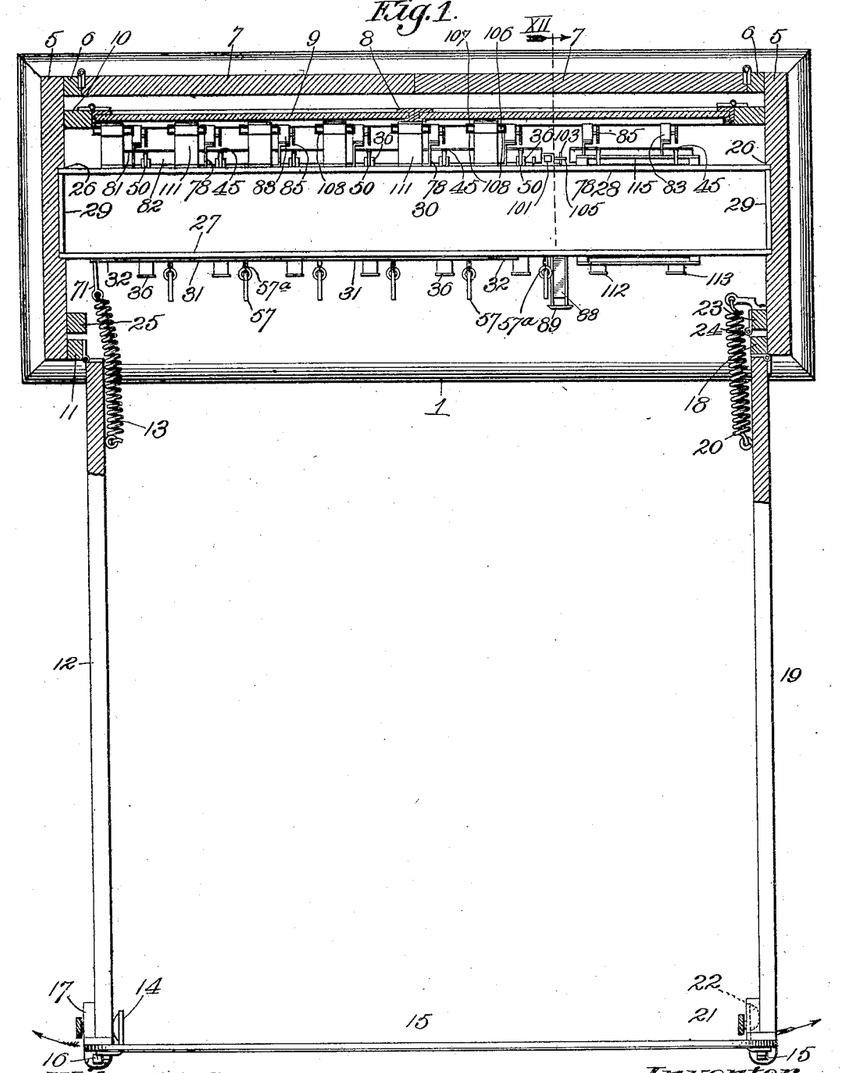
Figure 1 is a horizontal section of a voting-booth and voting-machine embodying my invention, the voting-machine proper being shown in top plan view.
Figure 2:
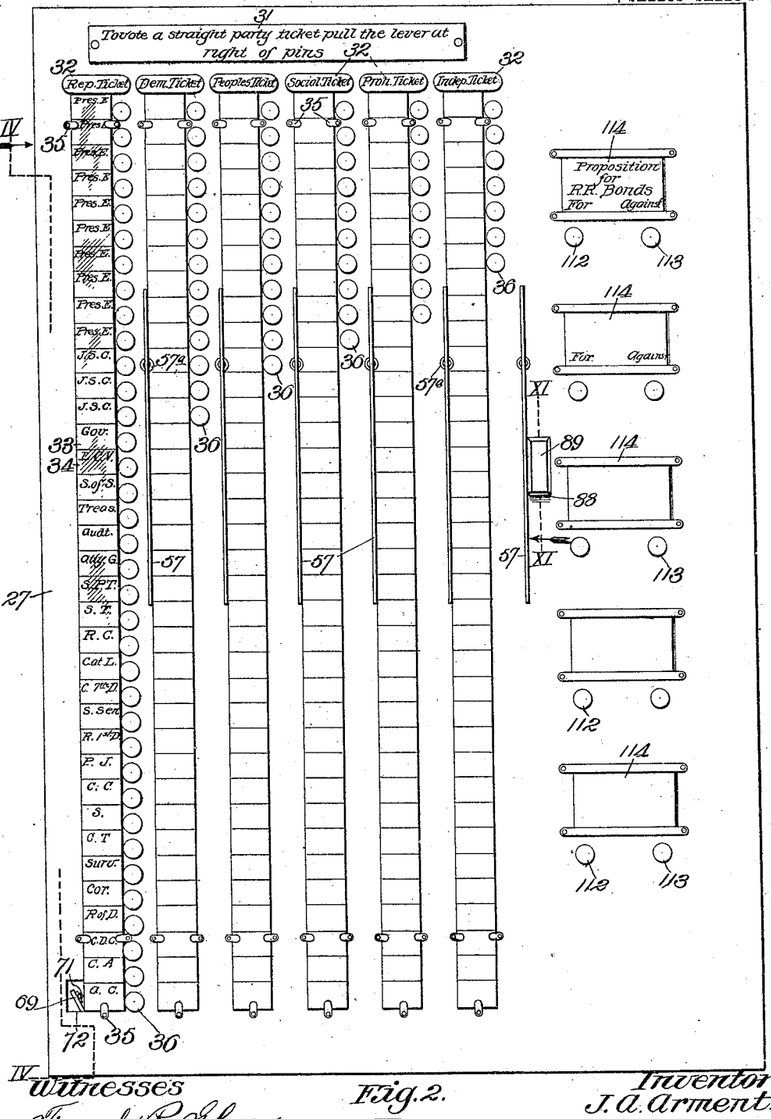
Fig. 2 is a front elevation of the voting-machine, but disclosing only a few of the push-pins.

36 designates a vertical series of push-pins for each ticket, there being a pin opposite the name of each candidate, and the pins for all of the candidates for the same office are arranged in horizontal alinement. In the drawings only one complete column of push-pins is shown, all of the other columns being incomplete because they are duplicates of that which appears. The push-pins are arranged horizontally and extend through alined openings 37 and 38 of the front and back walls of the casing, and in this connection it will be noted that only a few of the holes 37 of Fig. 1 are shown, it being understood, of course, that there is a hole 37 for each push-pin and that there is likewise a hole 38 for each push-pin in the back wall. It will also be noted that one full column of the holes 38 appear in Fig. 3, but only a few of the holes of the other columns appear in said figure.

Each push-pin is preferably provided at its front end with a head or enlargement 39 and with a vertically-disposed longitudinal slot 40, contiguous to wall 27 of the casing, the pin rearward of said slot being reduced in width so as to provide a rearwardly-disposed shoulder 41 for a purpose which hereinafter appears. Each pin near its rear end is also provided with a recess 42 in its under side and has said end beveled upwardly and forwardly, as at 43, and provided with a recess 44, wherein is pivoted for limited movement in a vertical plane the dog 45, said dog never rising to a higher position than that shown in full lines, Fig. 9, or dropping to a lower position than that shown in dotted lines, said figure.

Each pin is provided at a suitable point in the upper part of its narrow portion with a transverse notch 46, and in order to prevent the pins from turning a vertical bar 47 extends through the slots 40 of all of the push-pins in a single column, these bars having at their upper ends loops 48, slidingly mounted upon cross-rods 49, said rods being preferably bent to form handles 50, disposed rearwardly of the casing and removable only when it is desired to obtain access to the interior of the machine for repair or other purposes.

It has been stated that bars 47 prevent pins 36 from turning, which is true; but the chief function of said bars is to impart simultaneous movement to the entire column of pins—for instance, when it is desired to vote a straight party-ticket. To move one of said bars bodily rearward, and thereby force the entire column of pins with which it is connected in the same direction, I provide the following mechanism: 51 represents bearings secured to the rear side of the front wall of the casing, there being preferably three sets of these bearings, the bearings of each set being preferably disposed at opposite sides of the related column of pins, and journaled in said bearings are bell-crank levers which consist of rearwardly-projectng arms 52, normally horizontal, and depending arms 53, normally vertical and resting against the front wall of the casing, the arms 53 terminating in arms 54, which project laterally between contiguous push-pins and forward of the proximate bar 47, the arms 54 of the bell-cranks being equipped with antifriction-rollers 55 to bear against said bar 47 and eliminate friction as far as practicable, and in order that movement imparted to one of said bell-cranks shall be transmitted to the other their arms 52 are pivotally connected by a link 56, one of each set of the bell-cranks being provided with an extension-lever 57, which extends through the front wall of the casing when at rest and projects upwardly substantially parallel to said wall, as shown in Figs. 4 and 5, and said lever near its upper end is connected by a chain 57ᵃ or other flexible non-elastic connection to the front wall of the casing, so as to limit the movement of the lever when it is grasped and pulled forwardly for the purpose of voting a straight party-ticket.

Figure 7:
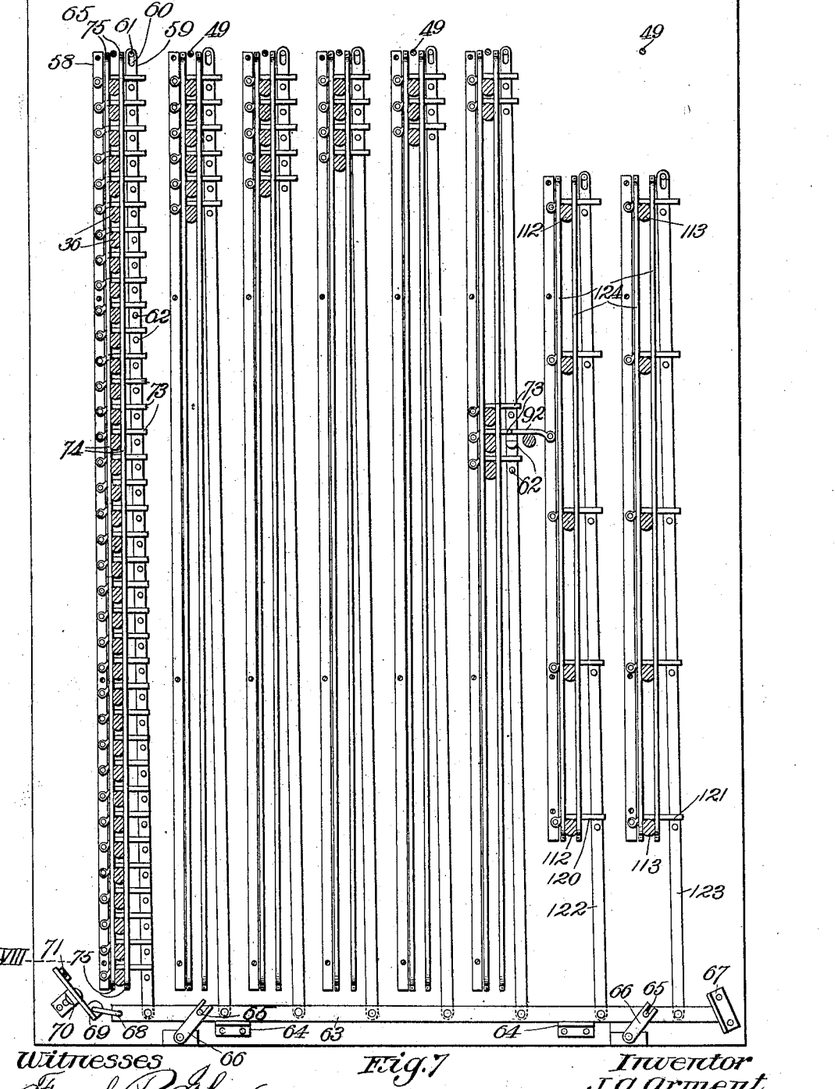
Fig. 7 is a vertical section taken on the line VII VII of Fig. 4.
Figure 8:
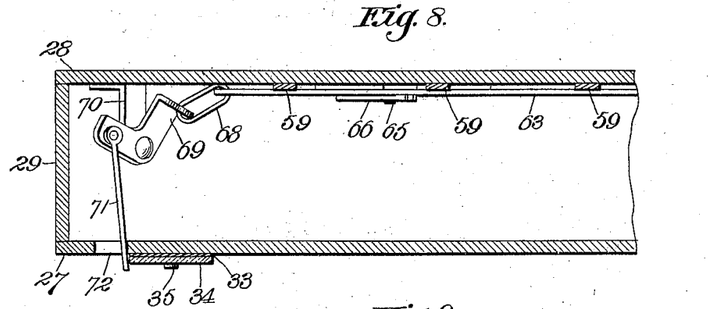
Fig. 8 is an enlarged horizontal section taken on the dotted line VIII of Fig. 7.

Secured to the front side of the back wall of the casing at opposite sides of each set of push-pins is a stationary bar 58 and a movable bar 59, the latter diverging downwardly from the pins by preference and having its upper end provided with a longitudinal slot 60, engaging the guide-pins 61, secured to said wall, and said bar opposite each push-pin is provided with a projecting lift-pin 62 and at its lower end is pivotally connected to the substantially horizontal link 63, supported when at rest upon brackets 64 and provided with forwardly-projecting pins 65, fitting in the bifurcated upper ends of rock-arms 66, suitably supported from said wall. At the right-hand end of the bar is a stop 67 to positively limit movement in one direction, and said bar at its opposite end is pivotally connected by a link 68 to an obliquely-arranged bell-crank lever 69, mounted on a bracket 70, secured to the back wall, the opposite end of the bell-crank lever being pivotally connected by a rod 71, extending forward through opening 72 of the front wall to the spring 13 of door 12, said spring being of such stiffness or strength that when the door is opened it rocks said bell-crank lever and swings link 63 upwardly and to the left, so as to simultaneously elevate all of the bars 59 and cause their lift-pins 62 to perform a function hereinafter referred to, the spring yielding after such function is performed, so as to permit the door to be opened sufficiently wide to admit a voter to the booth, when the door closes automatically under the retractive action of said spring and permits link 63 and said lifting-bars 59 to resume their original positions, as shown in Fig. 7. 73 designates a series of dogs which are pivoted to bars 58 and overlie the push-pins and said lift-pins, said dogs normally resting on the unnotched portion of the pins rearward of their notches 46 and disposed forward of and contiguous to said dogs, and at the opposite sides of the reduced portion of each column of pins is a pair of bars 74, which are bent rearwardly at their upper and lower ends and secured rigidly, as at 75, to the back wall, said bars 74 coöperating with bars 47 in preventing turning movement of the push-pins and also providing a bearing for the rear ends of expansive coil-springs 76, mounted on said pins, the front ends of the springs bearing against the rearwardly-disposed shoulders 41 of the pins. By this arrangement it will be seen by reference to Figs. 9 and 10 that when a pin is pushed rearwardly from the position shown in dotted to the position shown in full lines, Fig. 9, the spring is compressed until notch 46 assumes a position vertically below its overlying dog 73, when the latter by gravity drops into said notch and locks the pin in its new position, and it will be understood that when the lever 57 is operated to cause the connected bar 47 to simultaneously push an entire column of pins inwardly all of said pins will be simultaneously locked in their new position by the engagement with their notches 46 of the corresponding dogs 73. It will be furthermore noted in this connection that when the entrance-door 12 is opened, as hereinbefore explained, the lift-pins 62 will in their upward movement raise said dogs to their original positions and unlock the repressed pin or pins, the spring or springs of said pin or pins immediately restoring them to their original positions, as shown in full lines in Figs. 1, 4, and 5 and in dotted lines, Fig. 9.

Figure 3:
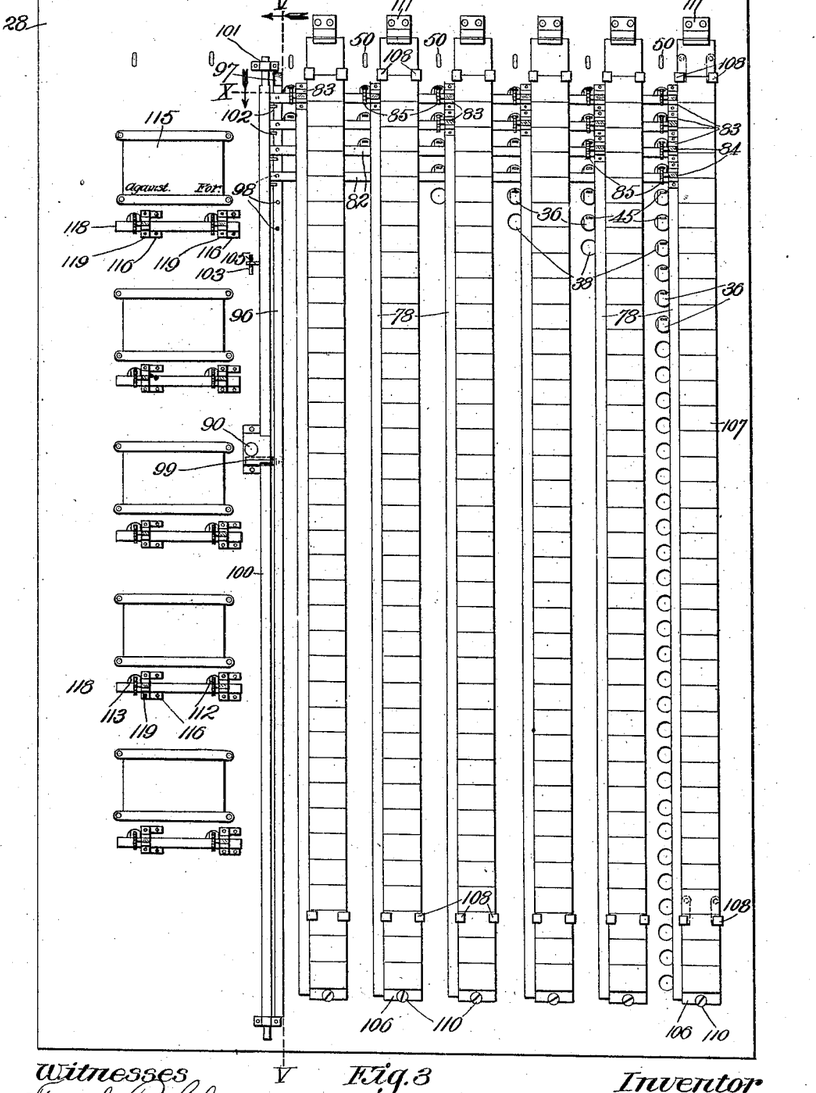
Fig. 3 is a back view of the voting-machine on the same scale as Fig. 2, certain parts being omitted because duplicates of others illustrated.
Figures 4, 5, 11, 12, 13:
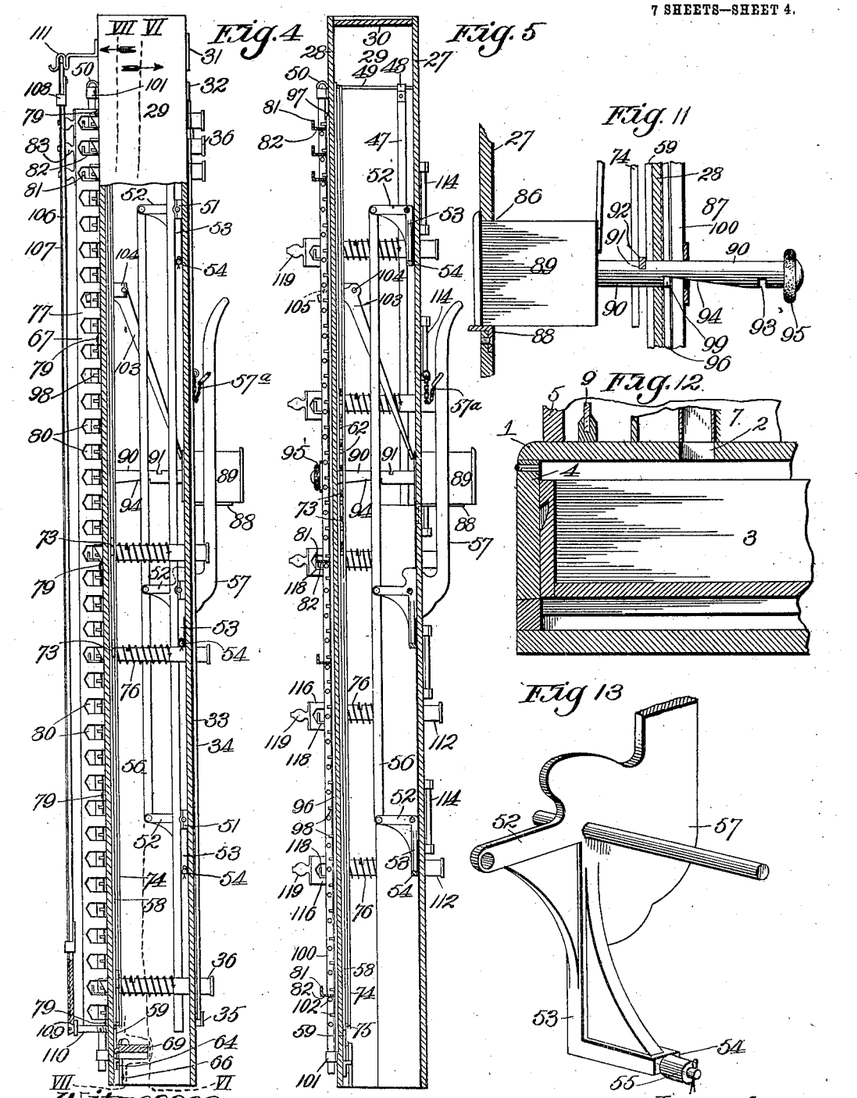
Fig. 4 is a vertical section taken on the line IV IV of Fig. 2.
Fig. 5 is a vertical section taken on the line V V of Fig. 3.
Fig. 11 is a vertical section on a smaller scale than Figs. 9 and 10, taken on the line XI XI of Fig. 1, but with the ballot-slide pushed back to deliver an ordinary ballot to the machine, containing one or more names, which do not appear on the machine, and therefore cannot be voted through the medium of the push-pins.
Fig. 12 is a fragmentary vertical section through the base portion of the voting-machine booth on the dotted line XII.
Fig. 13 is a detail perspective view of the lower end of one of the bell-crank levers equipped with a lever or handle.
Figure 6:
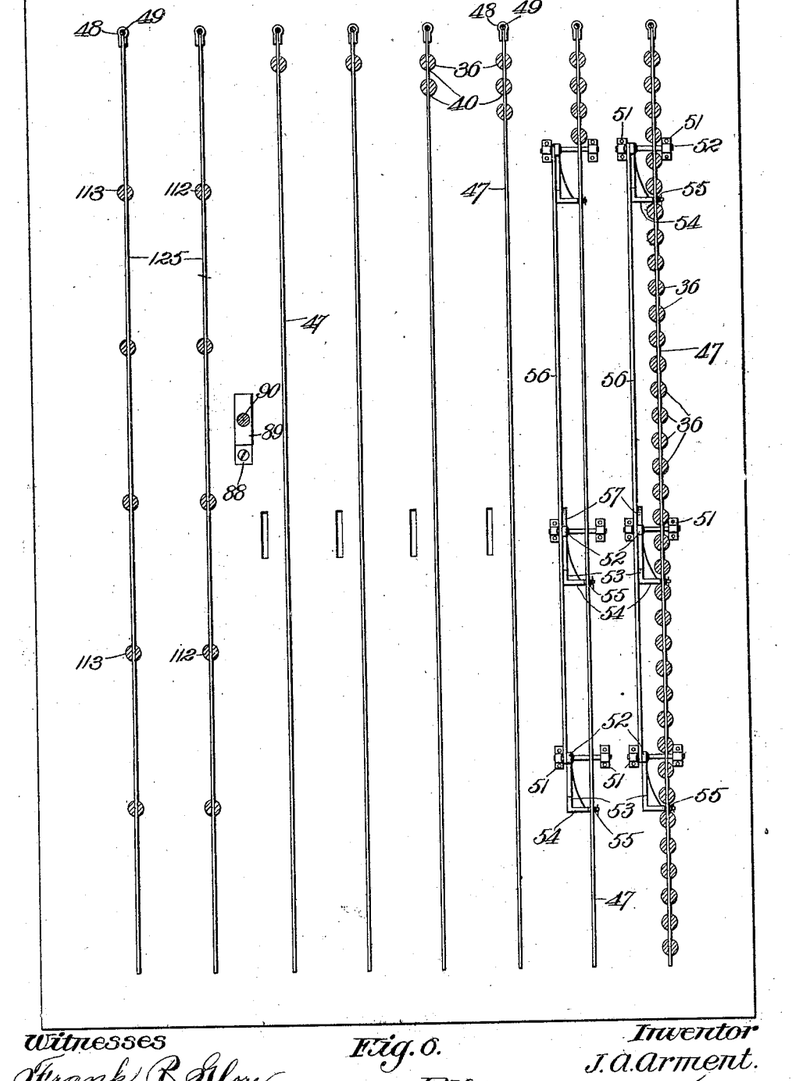
Fig. 6 is a vertical section taken on the line VI VI of Fig. 4.
Figure 9:
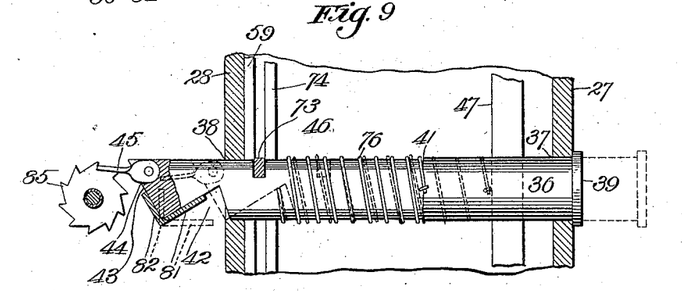
Fig. 9 is a vertical section taken on the line IX IX of Fig. 10 and on a still larger scale than Fig. 7.
Figure 10:
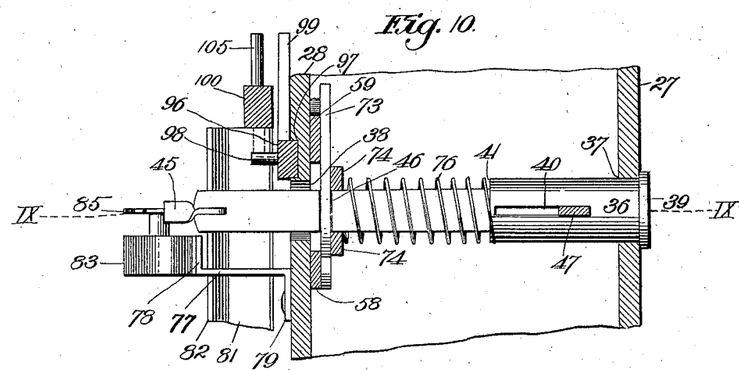
Fig. 10 is a horizontal section taken on the dotted line X of Fig. 3.

Paralleling each column of pins and arranged, by preference, contiguous to the right-hand side of said pins is an angle-plate consisting of the rearwardly-projecting arm 77, and the laterally-projecting arm 78 and said angle-plate is provided with a plurality of laterally-projecting lugs 79, secured to the rear face of the back wall, as shown most clearly in Figs. 4 and 10, and opposite each pin the arm 77 of the angle-plate is provided with an opening 80, upon the bottom of which rests an angular rocker-bar, said bar consisting of the arm 81, normally horizontal and disposed slightly below the plane of the pin, and the arm 82, projecting upwardly from the rear margin of arm 81, there being one rocker-bar for each horizontally-alined series of push-pins, as shown most clearly in Fig. 3, so that when one of the push-pins shall be pushed in its rear end shall strike the upwardly-projecting arm of the registering rocker-bar and shall tilt the same from the position shown in dotted to the position shown in full lines, Fig. 9, in which position it will be noticed its arm 81 occupies the recess 42 in the lower side of the repressed pin and opposes inward movement of any other horizontally-alined pin, and therefore prevents the operation of any other pin or pins in the same horizontal line.

For each push-pin a register 83 is rigidly secured to the arm 78 of the proximate angle-plate, and said register is provided at its rear side with an opening 84, through which appears the number of votes cast for the candidate which that particular pin represents, the register being provided with a ratchet-wheel 85, disposed in the path of dog 45 of said pin, the arrangement being such, as will be noticed by reference to Fig. 9, that each time a push-pin is moved inward the opposing ratchet-wheel is turned one step to register one vote. The detail construction of the register is not shown, because it is well known and has no dependent relation on this invention.

For the purpose of permitting an ordinary ballot to be cast for a candidate or candidates whose names do not appear on any of the tickets an ordinary ballot (not shown) is employed, and to vote such ballot the following mechanism is provided: To the right of the right-hand column of push-pins and also to the right of the lever 57 for the operation of said column of push-pins the front and back walls, respectively, of the casing are provided with a rectangular opening 86 and a hole 87, and forming the bottom of said opening 86 is a plate 88, which projects forward a suitable distance and forms a bottom for the tubular slide 89 when the latter occupies its normal position, as shown in Figs. 4 and 5, so that a ballot dropped in said tubular slide shall be retained therein by the plate 88. Projecting rearward from the slide is a stem 90, preferably cylindrical, and said stem is provided with a notch 91 for engagement when the slide is pushed in to deposit a ballot by the dog 92, suitably pivoted and having its free end overlying one of the pins 73 of the contiguous lift-bar 59, said underlying pin of said lift-bar being, preferably, enlarged, as shown in Fig. 7, in order that dog 92, as well as the proximate dog 73, may be reliably lifted when the entrance-door is opened. It is impossible to release the ballot-slide without opening said door. In the rear portion and lower side of said stem 90 is a notch 93 and a notch 94, the last-named notch extending forwardly from a point contiguous to notch 93 a distance nearly equal to the length of the slide movement, the length of such movement being represented by the distance between notch 93 and the front end of notch 94 and secured to the rear end of the stem in any suitable manner, and of greater diameter than the same is a cushioned stop 95.

96 designates a vertical slide, which is shown as set in a vertical groove 97 in the rear face of the back wall of the casing, said groove extending beyond the upper end of the slide to permit the latter to be raised. Said slide has a series of rearwardly-projecting pins 98, closely overlying the normally horizontal arms 81 of the rocker-bars, as shown most clearly in Figs. 3, 4, 5, and 10, there being one of said pins for each rocker-bar, so that the operation of a single rocker-bar shall result in the elevation of said slide-bar, and therefore raise the laterally-projecting lug 99 of said bar up into notch 93 of the ballot-slide stem and make it impossible to vote a ballot after a vote has been cast for a candidate of one of the parties represented by the labels, said slide-bar 96 being permitted to gravitate to its original position when the entrance-door is opened, and the rocker-bar is therefore returned to its original position. On the other hand, when an ordinary ballot is cast through the instrumentality of the ballot-slide it is impossible to vote for a candidate of one of the parties represented by the labels, this result being accomplished through the following mechanism: 100 designates a vertical slide-bar arranged contiguous to the left-hand end of the series of rocker-bars when viewed from the rear, as shown in Fig. 3, and said slide-bar 100 is guided in suitable keepers 101, secured to the back wall, and is provided with a series of laterally-projecting pins 102, which underlie the horizontal arms 81 of the rocker-bars, said pins being spaced apart from the rocker-bars a slight distance for a purpose which is presently explained. In order that the slide

100 may be disposed between slide 96 and the stem of the ballot-slide without being in the way of lug 99 of slide 96, said slide 100 is preferably spaced from the back wall of the casing a distance slightly exceeding the thickness of said lug, though any other suitable arrangement may be made for the purpose.

103 designates a bell-crank lever pivoted, as at 104, in the casing and having one arm bearing against the rear end of the ballot-slide and its front arm projecting rearwardly through a slot in the back wall of the casing and underlying a pin 105, projecting laterally from the slide-bar 100. If the occupant of the booth desires to vote by ballot and after placing his ballot in the ballot-slide pushes the latter rearward from the position shown in Figs. 4 and 5 to the position shown in Fig. 11, he forces the lower end of the bell-crank lever rearward and causes its opposite end to lift slide-bar 100. By the time said slide-bar movement lifts pins 102 into engagement with the arms 81 of the rocker-bars the long notch 94 of the ballot-slide stem registers at its rear or shallow end with the lug 99 of slide-bar 96, so that as the lever continues its upward movement the slide-bar 100 through the instrumentality of its pins rocks all of the rocker-bars and through the engagement of said rocker-bars with the overlying pins of the slide-bar 96 raises the latter, and consequently its lug 99, said lug being permitted to rise because of the notch 94 in the ballot-slide pin, it being understood in this connection that said notch 94 performs no other function than that of accommodating lug 99 when slide 96 is raised through the instrumentality of lever 103, said slide 96 simply rising because its pins are in the path of the rocker-bars. When the slide-bar 96 is raised, as hereinbefore explained, by one or more rocker-bars actuated by one or more of the push-pins, the lug 99 rises into notch 93 of the ballot-slide stem and locks said ballot-slide from being pushed inward or rearward. It will be seen, therefore, that the notch 93 performs a positive function, whereas notch 94 is provided simply to accommodate the elevation of lug 99, and has no other function, the dog 92, as hereinbefore explained, locking the ballot-slide in its repressed position by engagement with its stem-notch 91.

In order to show at a glance how many votes have been cast for the candidates of any party, a plate 106 of wood or any other suitable material is arranged vertically to the right of each series of registers, and secured to the rear face of said plate is a printed slip or ticket 107, corresponding to the printed tickets or slips 33 at the front of the casing, said strips or tickets 107 being preferably detachably secured to the plates 106 by pivoted hooks 108, secured to said plates. The plates are preferably provided with notches 109 in their lower ends for engagement with the headed ends of supporting-screws or analogous devices 110, projecting from the rear wall of the casing near its lower end, and at their upper ends said plates are engaged by spring-catches or their equivalents 111, secured to said back wall near its upper end, the arrangement being such that the register for any particular push-pin is opposite the name of the slip or ticket 107 of the particular candidate represented by said pin. It will thus be seen that the vote for any particular candidate can be determined at a glance by reference to the proximate register.

For the purpose of utilizing the machine for special elections or for special propositions affecting the particular district, county, or State where the machine is located, and which, therefore, will be voted on without regard to questions of partizanship, I have provided a separate voting mechanism for each proposition, each comprising a pair of horizontally-alined push-pins 112 and 113, and have so located said mechanisms that all of the pins 112 are vertically alined and all of the pins 113 are likewise vertically alined, said pins being of precisely the same construction and arrangement as the pins hereinbefore described. Above each set of pins 112 and 113 and secured to the front of the casing are suitably-retained plates 114, containing the propositions to be voted on—for instance, propositions for railroad bonds—and said plates also contain the words "For" and "Against," the words "For" being disposed in line with pins 112 and the words "Against" in line with pins 113, so that the operation of the push-pins 112 will be a vote for and the operation of push-pins 113 a vote against the proposition, and in this connection it should also be stated that means may be employed similar to those described for simultaneously voting the entire column of pins 112 or 113, though such mechanism is deemed unnecessary and is therefore omitted. At the rear side of the casing above said sets of pins are plates 115 similar to plates 114, which plates 115 are adapted to contain the same proposition as the opposite plate 114, and said plates 115 contain the words "For" and "Against" in vertical alinement with the pins 112 and 113. Near each pin 112 113 is a bracket 116, corresponding in all respects to brackets 77, except that the former are of size to accommodate only a single rocker-bar, as at 118, though of course the vertically-alined brackets 116 may be integral, if desired, and secured to each bracket is a register 119, which is adapted to be operated by pushing in its respective push-pin, the inward movement of any particular pin rocking the rock-bar to cause it to lock the horizontally-alined push-pin from operation. It will thus be seen that if a voter casts an affirmative vote for any proposition it will be impossible for him to cast a negative vote on the same proposition. It will also be noticed by reference to Fig. 7 that means are provided for locking the push-pins 112 113 repressed, which correspond in all particulars to those provided for locking push-pins 36 in their repressed positions, the means or dogs for locking pins 112 being numbered 120 and the dogs for locking pins 113 being numbered 121. To respectively unlock said pins when the door is opened, lift-bars 122 123 are pivoted at their lower end to the link 63, said pins 112 113 being also disposed between parallel bars 124 to prevent them turning, and to coöperate with said guide-bars 124 vertical bars 125 extend through the vertically-alined slots of the pins and are suspended from above like bars 47, bars 125, however, not being designed for operating the related pins unless it is desired to operate the "for" and "against" pins collectively. As the operations of the various parts of the machine have been explained in connection with the detailed description of the parts, a recapitulation of the entire operation is deemed unnecessary.

From the above description it will be apparent that I have produced a voting-machine which possesses the features of advantage enumerated as desirable and which obviously is susceptible of modification without departing from the principle of construction involved or sacrificing any of its advantages.

Having thus described the invention, what I claim as new, and desire to secure by Letters Patent, is—

1. The combination of a booth having an entrance-door, and an exit-door, a voting-machine in said booth, interlocked mechanism for the voting-machine adapted to be locked under the manipulation of the voter, and extensible means forming a connection between the entrance-door and the interlocked mechanism to cause the first part of the opening movement of said door to unlock said mechanism and the latter part of such opening movement to occur without affecting the interlocked mechanism.

2. The combination of a booth having an entrance-door and an exit-door, a voting-machine in said booth, and a retractile spring connecting the entrance-door with the mechanism of the voting-machine, so that the opening of the entrance-door shall restore all of the operated parts of the machine, except the registering mechanism to their original positions, and then stretch said spring in swinging open, a sufficient distance to admit a voter to the booth.

3. In a voting-machine, a series of alined push-pins, a rocker-bar in the path of all of said pins, and adapted to be rocked when either of them is pushed in, to a position which prevents the others from being likewise operated, and means whereby said rocker-bar is locked in its new position and the push-bar is prevented from being operated a second time until the rocker-bar has assumed its original position, in combination with a voting-booth having an entrance-door and an exit-door, and a connection between said entrance-door and the voting-machine for effecting the restoration of the rocker-bar and pushed pins to their original position when said door is opened.

4. In a voting-machine, a series of alined push-pins, a rocker-bar in the path of all of said pins, and adapted to be rocked when either of them is pushed in, to a position which prevents the others from being likewise operated, means whereby said rocker-bar is locked in its new position and the push-pin is prevented from being operated a second time until the rocker-bar has assumed its original position, and a register for each push-pin and adapted to be operated each time the companion push-pins are pushed in.

5. In a voting-machine, a series of alined push-pins, a rocker-bar in the path of all of said pins, and adapted to be rocked when either of them is pushed in, to a position which prevents the others from being likewise operated, a register for each push-pin and adapted to be operated each time the related push-pin is pushed in, a dog to lock each pushed pin and the rocker-bar in their new positions, means for tripping said dog, and means to restore said operated parts to their original positions when the dog is tripped.

6. In a voting-machine, a series of alined push-pins, a rocker-bar in the path of all of said pins, and adapted, to be rocked when either of them is pushed in, to a position which prevents the others from being likewise operated, a register for each push-pin and adapted to be operated each time the related push-pin is pushed in, a dog to lock each pushed pin and the rocker-bar in their new positions, slide-bars having pins contiguous to said dogs, means for sliding said bars and causing their pins to trip said dogs, and means when the dogs are tripped, to restore the rocker-bar and the pushed pin to their original positions.

7. In a voting-machine, a series of alined push-pins, a rocker-bar in the path of all of said pins, and adapted to be rocked when either of them is pushed in, to a position which prevents the others from being likewise operated, a register for each push-pin and adapted to be operated each time the related push-pin is pushed in, a dog to lock each pushed pin and the rocker-bar in their new positions, slide-bars having pins contiguous to said dogs, means for sliding said bars and causing their pins to trip said dogs, a link pivotally connecting said pin-carrying slide-bars, means to cause said link to move said slide-bars and cause their pins to trip said dogs, and means when the dogs are tripped, to restore the rocker-bar and pushed pin to their original positions.

8. In a voting-machine a series of alined push-pins, a rocker-bar in the path of all of said pins, and adapted to be rocked when either of them is pushed in, to a position which prevents the others from being likewise operated, a register for each push-pin and adapted to be operated each time the related push-pin is pushed in, a dog to lock each pushed pin and the rocker-bar in their new positions, slide-bars having pins contiguous to said dogs, means for sliding said bars and causing their pins to trip said dogs, a link pivotally connecting said pin-carrying slide-bars, rock-arms having a pin-and-slot connection with said link, a lever connected to the link to impart endwise movement to the same and cause said rock-arms to move said link while its endwise movement is in progress and thereby effect the tripping of the dogs, and means when said dogs are tripped, to restore the rocker-bar and pushed pin to their original positions.

9. In a voting-machine, parallel series of alined push-pins representing candidates of the same party for different offices, push-pins representing the candidates of the different parties for the same offices extending in lines at right angles to the same-party-candidate pins, a rocker-bar in the path of each series of alined pins representative of candidates for the same office, adapted to be rocked when either of said pins is pushed in, to a position which prevents the others from being likewise operated, means whereby all of the alined pins representative of the candidates of the same party may be simultaneously pushed in, and means whereby the operation of a pin counts and records one vote.

10. In a voting-machine, parallel series of alined push-pins representing candidates of the same party for different offices, push-pins representing the candidates of the different parties for the same offices, extending in lines at right angles to the same-party-candidate pins, a rocker-bar in the path of each series of alined pins representative of candidates for the same office, adapted to be rocked when either of said pins is pushed in, to a position which prevents the others from being likewise operated, a vertical bar extending through said alined series of pins, bell-crank levers suitably mounted and linked together and having arms at the front sides of said bars, and a lever-arm or extension projecting from one of said bell-crank levers and disposed at the front side of the casing.

11. In a voting-machine a parallel series of alined push-pins representing candidates of the same party for different offices, push-pins representing the candidates of the different parties for the same offices, extending in lines at right angles to the same-party-candidate pins, a rocker-bar in the path of each series of alined pins representative of candidates for the same office, adapted to be rocked when either of said pins is pushed in, to a position which prevents the others from being likewise operated, means whereby all of the alined pins representative of the candidates of the same party may be simultaneously pushed in, means whereby the operation of a pin counts and records one vote, a dog for and adapted to lock each pin in its pushed-in position, means for tripping said dogs, and means to restore each pin to its original position after the dog is tripped.

12. In a voting-machine, a push-pin, a register to be operated each time said push-pin is operated, a rocker-bar rocked by said pin in such operation, in combination with a ballot-slide, and a slide-bar operated by movement of the rocker-bar to lock the ballot-slide from movement.

13. In a voting-machine, a push-pin, a register to be operated each time the push-pin is operated, a rocker-bar rocked by said pin in such operation, in combination with a ballot-slide, and a slide-bar provided with a pin in the path of the rocker-bar and with a lug to be disposed in the path of the ballot-slide when the rocker-bar by engagement with said pin moves the slide-bar.

14. The combination of a push-pin, a rocker-bar, a slide-bar, a ballot-slide, and means whereby the operation of said ballot-slide shall operate said slide-bar and cause the latter to rock the rocker-bar and dispose it in the path of the push-pin so that the latter cannot be operated.

15. The combination of a push-pin, a rocker-bar, a slide-bar, a ballot-slide, and a lever adapted to be operated by the movement of the ballot-slide and to cause the ballot-slide to operate and rock the rocker-bar into the path of the push-pin to prevent the operation of the latter.

16. The combination of a push-pin, a rocker-bar, a slide-bar, a ballot-slide, a lever adapted to be operated by the movement of the ballot-slide and to cause the ballot-slide to operate and rock the rocker-bar into the path of the push-pin to prevent the operation of the latter, means to lock the ballot-slide in its new position, and means for freeing the ballot-slide to permit it to resume its original position.

17. In a voting-machine, a casing, a push-pin extending therethrough, and provided with a notch in its lower side, a rocker-bar of substantially L shape having its upwardly-projecting arm in the path of the pin and its lower arm adapted to swing up into the notch of the pin when the latter is pushed in and by striking against the upwardly-projecting arm, rock said rocker-bar, means for locking the push-pin and therefore the rocker-bar in their new positions, means for tripping said locking means, and means for restoring the push-pin and rocker-bar to their original positions and relation.

In testimony whereof I affix my signature in the presence of two witnesses.

JAMES A. ARMENT.

Witnesses:
 NELSON CRAWFORD,
 F. W. TYLER.